United States Patent
Zaghib et al.

(10) Patent No.: US 8,828,609 B2
(45) Date of Patent: Sep. 9, 2014

(54) METHOD FOR PREPARING AN ELECTROCHEMICAL CELL HAVING A GEL ELECTROLYTE

(75) Inventors: Karim Zaghib, Longueuil (CA); Manabu Kikuta, Kyotanabe (JP); Martin Dontigny, Varennes (CA); Abdelbast Guerfi, Brossard (CA); Michiyuki Kono, Neyagawa (JP)

(73) Assignees: Hydro-Quebec, Montreal, Quebec (CA); Dai-Ichi Kogyo Seiyaku Co., Ltd., Kyoto (JP)

( * ) Notice: Subject to any disclaimer, the term of this patent is extended or adjusted under 35 U.S.C. 154(b) by 947 days.

(21) Appl. No.: 12/921,453

(22) PCT Filed: Mar. 5, 2009

(86) PCT No.: PCT/CA2009/000222
§ 371 (c)(1),
(2), (4) Date: Feb. 3, 2011

(87) PCT Pub. No.: WO2009/111860
PCT Pub. Date: Sep. 17, 2009

(65) Prior Publication Data
US 2011/0287325 A1    Nov. 24, 2011

(30) Foreign Application Priority Data

Mar. 11, 2008  (CA) .................................. 2625271

(51) Int. Cl.
*H01M 10/0565* (2010.01)
*H01M 10/04* (2006.01)
*H01G 11/56* (2013.01)

(52) U.S. Cl.
CPC .. *H01M 10/0565* (2013.01); *H01M 2300/0085* (2013.01); *H01G 11/56* (2013.01); *Y02E 60/12* (2013.01)
USPC ........... 429/303; 429/188; 429/300; 429/301; 429/302

(58) Field of Classification Search
USPC .................................. 429/300–303
See application file for complete search history.

(56) References Cited

U.S. PATENT DOCUMENTS

| | | | |
|---|---|---|---|
| 8,354,188 B2 | 1/2013 | Takano et al. | |
| 2003/0108800 A1* | 6/2003 | Barbarich | 429/324 |
| 2003/0175594 A1* | 9/2003 | Roh et al. | 429/303 |
| 2004/0024151 A1 | 2/2004 | Becker et al. | |
| 2004/0126665 A1* | 7/2004 | Sun | 429/303 |
| 2004/0157118 A1 | 8/2004 | Uetani et al. | |
| 2004/0234865 A1 | 11/2004 | Sato et al. | |
| 2004/0241551 A1* | 12/2004 | Nakamura et al. | 429/303 |
| 2007/0111105 A1 | 5/2007 | Zaghib et al. | |

FOREIGN PATENT DOCUMENTS

| | | |
|---|---|---|
| JP | 2001-243986 A | 9/2001 |
| JP | 2004-342318 A | 12/2004 |
| JP | 2005-050707 A | 2/2005 |
| JP | 2005-183249 A | 7/2005 |
| JP | 2006-278235 A | 10/2006 |
| JP | 2008-243718 A | 10/2008 |
| WO | WO 2004/045007 A2 | 5/2004 |

OTHER PUBLICATIONS

Japanese Office Action (Notice of Reasons for Rejection) issued May 21, 2013 by the Japanese Patent Office in Japanese Patent Application No. 2010-550001 and English language translation of Japanese Office Action (10 pgs).
International Search Report (PCT/ISA/210) dated May 27, 2009.
English-language translation of Official Action issued by Chinese Patent Office in Chinese Application No. 200980108530.5 (3 pgs).

* cited by examiner

*Primary Examiner* — Kenneth Douyette
*Assistant Examiner* — James Lee
(74) *Attorney, Agent, or Firm* — Buchanan Ingersoll & Rooney P.C.

(57) ABSTRACT

The invention relates to a method for manufacturing an electrochemical cell comprising an anode and a cathode separated by a separator and a gel electrolyte. The method comprises the steps of assembling the electrodes and the separator, and injecting a liquid electrolyte composition between the electrodes, the liquid electrolyte composition comprising a polymer, an aprotic liquid solvent and a lithium salt, wherein the polymer in the liquid electrolyte composition has functional groups capable of polymerizing via cationic polymerization, and the cell is submitted to an electrochemical cycling comprising a charging step and a discharging step.

25 Claims, No Drawings

METHOD FOR PREPARING AN ELECTROCHEMICAL CELL HAVING A GEL ELECTROLYTE

FIELD OF THE INVENTION

The present invention relates to an electrochemical cell having a gel electrolyte.

BACKGROUND

Electrochemical cells wherein the electrolyte is a gel electrolyte are known, particularly electrochemical cells working on the base of lithium ions circulation in the electrolyte between the electrodes. In such electrochemical cells, it is advantageous to use a gel electrolyte instead of a liquid electrolyte or a solid polymer electrolyte, compared to the use of a liquid electrolyte because a gel electrolyte has no free liquid, and the absence of free liquid guaranties a higher safety while maintaining a high ionic conductivity. It is also advantageous compared to a solid polymer electrolyte, because a gel electrolyte is more flexible than a polymer electrolyte and allows easier processing.

Methods are known for preparing an electrochemical cell comprising a lithium anode, a cathode and a gel electrolyte, which method comprises stacking an anode film, a separator and a cathode film, inserting the assembled elements in a plastic metal bag which is then sealed, injecting an electrolyte composition into the assembled cell, sealing the plastic metal bag. The electrolyte composition comprises a crosslinkable polymer which is crosslinked after sealing the plastic metal bag. According to US 2007/0111105 (Zaghib et al.), crosslinking is promoted by irradiation via an electron beam or by a thermoinitiator. According to WO 2004/045007 (Zaghib et al.), crosslinking of the polymer in the electrolyte composition is carried on by heat treatment at 80° C.

In any case, the prior art methods for the preparation of an electrochemical cell having a gel electrolyte request a heat treatment and/or addition of an initiator to obtain a gel electrolyte from a liquid electrolyte.

SUMMARY OF THE INVENTION

An object of the present invention is to provide a method for the production of an electrochemical cell which does not request any heat treatment or initiator and which provides an electrochemical cell having a higher coulombic efficiency.

According to an aspect of the invention, there is provided a method for manufacturing an electrochemical cell having an anode and a cathode separated by a separator and a gel electrolyte, said method comprising the steps of assembling the anode, the cathode and the separator, and injecting a liquid electrolyte composition between the anode and the cathode, said liquid electrolyte composition comprising a polymer, an aprotic liquid solvent and a lithium salt, wherein:
 the polymer in the liquid electrolyte composition has functional groups capable of polymerizing via cationic polymerization; and
 the cell is submitted to an electrochemical cycling comprising a charging step and a discharging step.

According to another aspect of the invention, there is provided an electrochemical cell obtained by said method.

Preferably, the electrochemical cell comprises a separator impregnated by a gel electrolyte, between an anode and a cathode, wherein the gel electrolyte comprises a polymer gelled by a liquid solvent and a lithium salt.

DETAILED DESCRIPTION OF THE INVENTION

The polymer used for preparing the liquid electrolyte composition is a polymer which has side groups which are polymerizable via cationic route. The polymer side groups are preferably allyl groups or cyclic ethers groups such as oxiranyl, oxetanyl, tetrahydrofuranyl and tetrahydropyranyl groups. The polymer may be a straight chain polymer having cationic polymerizable groups as side groups. The polymer may also be a branched polymer having cationic polymerizable groups as end groups. A straight chain polymer may be synthesized by radical polymerization of acrylic or/and methacrylic esters having side group. Preferred polymers are copolymers having at least two different kinds of monomeric units. For instance, a copolymer may have the following monomeric units A and B

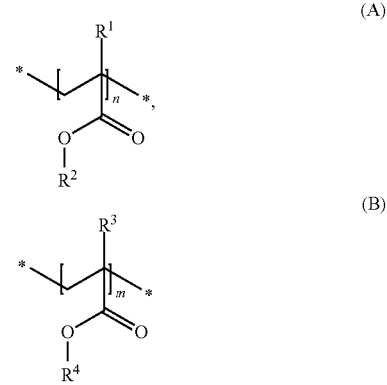

wherein:
 each of $R^1$ and $R^3$ is H or a methyl group,
 $R^2$ is a group which is unpolymerizable,
 $R^4$ is a group which is polymerizable via cationic route,
 n is the number of monomeric units A and m is the number of monomeric units B in the copolymer,
said copolymer having a molecular weight which is preferably from 200,000 to 700,000, and a m/(n+m) ratio which is preferably from 0.1 to 0.6.

The unpolymerizable group may be selected from:
 alkyl, alkenyl, cycloakyl, and aryl groups;
 groups derived from alkyl or alkenyl groups by insertion of a heteroatom, such as oxaalkyl, oxaalkenyl, azaalkyl, and azaalkenyl groups;
 cycloalkyl or aryl groups having a heteroatom (O or N) in the ring.

Straight chain polymers having cationic polymerizable side groups are available from Dai-ichi Kogyo Seiyaku Co. Ltd. under the trade-name ACG ELEXCEL™. Branched polymers with cationic polymerizable groups are also available from Dai-ichi Kogyo Seiyaku Co. Ltd. under the trade name ERM-1 ELEXCEL™.

The liquid solvent is a liquid compound able to dissolve the polymer, and preferably a polar aprotic solvent, such as a linear or cyclic ether, an ester, a nitrile, an amide, a sulfones, a sulfolane, an alkylsulfamide, or a partly halogenated hydrocarbide. Of particular interest are diethylether, dimethoxyethane, glyme, tetrahydrofurane, dioxane, dimethyltetrahydrofurane, methyl- or ethyl-formiate, propylene or ethylene carbonate, dialkyle carbonates (in particular dimethyl carbonate, diethyl carbonate, methyl propyl carbonate), vinylethyl carbonate, vinyl carbonate, butyrolactone, acetonitrile, benzonitrile, nitro-methane, nitrobenzene, dimethylformamide, diethylformamide, N-methylpyrrolidone, dimethylsulfone, tetramethylene sulfone and tetraalkylsulfonamides having 5 to 10 carbon atoms. The liquid solvent may also be selected from ionic liquids, which are salts having a organic cation such as an amidinium, a guanidinium, a pyridinium, a pyrimidinium, an imidazolium, an imidazolinium, a triazolium, or a phosphonium, and an anion such as $(FSO_2)_2N^-$ (FSI), $(CF_3SO_2)_2N^-$ (TFSI), $(C_2F_5SO_2)_2N^-$ (BETI), $PF_6^-$, $BF_4^-$, $ClO_4^-$, $CF_3SO_2$, oxalyldifluoroborate (BOB), or dicyanotriazolate (DCTA).

In the liquid electrolyte composition, the weight ratio "polymer/liquid solvent" is between 0.5 and 8%, preferably about 2%. The salt concentration in the liquid electrolyte composition is between 0.1 and 2.5 M.

The lithium salt is preferably selected from lithium halogenides LiX (X=Cl, Br, I or $I_3$), perfluorosulfonate ($C_nF_{2n}SO_3Li$), (trifluoromethylsulfonyl)imide $(N(CF_3SO_2)_2)Li$, bis(trifluoromethylsulfonyl)methide (HC$(CF_3SO_2)_2)Li$, tris-(trifluoromethylsulfonyl)methide $(C(CF_3SO_2)_3)Li$, perchlorate ($LiClO_4$), hexafluoroarseniate ($LiAsF_6$), hexafluorophosphate ($LiPF_6$), hexafluoroantimonate ($LiSbF_6$), tetrafluoroborate ($LiBF_4$), $(C_2F_5SO_2)_2NLi$, $(FSO_2)_2NLi$ (LiFSI) and oxalyldifluoroborate (LiBOB).

After the liquid electrolyte composition has been injected between the electrodes in the electrochemical cell, said cell is submitted to a single discharge-charge cycle at a cycling rate from C/5 to C/30, preferably C/24, at 25° C.

The anode is preferably a film made of a material selected from metallic lithium, a lithium rich intermetallic alloy such Li—Al, Li-steel, Li—Sn, Li—Pb, SiO, SnO, $SnO_2$, or SnCoC. In a lithium ion battery, the anode may also be a film of a material which is able to reversibly insert and deinsert lithium ions, such as carbon, $Li_4Ti_5O_{12}$, $SiO_x$ where $0.05<x<1.95$, or mixtures thereof.

The active material of the cathode may be selected from:
metal oxides such as $LiCoO_2$, $LiMn_2O_4$, $LiMn_{1/3}Co_{1/3}Ni_{1/3}O_2$, $LiNiO_2$ and Li(NiM')$O_2$ wherein M' represents one or two metal elements selected from Mn, Co, Al, Fe, Cr, Cu, Ti, Zr, Mg, and Zn,
phosphates such as $LiFePO_4$, and $LiMPO_4$ where M is Ni, Mn, or Co,
said oxides or phosphates possibly being in carbonated form.

During the reduction (of the electrolyte at a voltage <1 V), a passivation layer is formed in the surface of the electrode. This passivation layer is usually called Solid Electrolyte Interface (SEI). In lithium-ion batteries, the SEI is an ionic conductor and electronic insulator. The SEI layer on the surface of a graphite electrode is made of inorganic lithium salts, for instance LiF or $Li_3N$.

A major advantage of the method of the present invention is that there is no need to add a polymerization initiator and/or to heat the electrolyte composition to provide gel formation. The inventors discovered that the lithium salt present in the electrolyte composition and/or the compounds formed in the passivation layer on the electrodes when the electrochemical cell is submitted to the first cycling act unexpectedly as a cationic initiator for polymerization of the functional groups, without requesting a further initiator or heating.

A further advantage of the method of the invention is that it allows using smaller amounts of polymer. Usually, in the standard gel preparation, the gel composition has a polymer/liquid solvent w/w ratio from of 5 to 15% and it contains a curing agent (initiator). In a gel electrolyte of the present invention, the amount of polymer may be as low as 0.5%.

The method of the invention provides an electrochemical cell comprising an anode and a cathode separated by a separator impregnated by a gel electrolyte. The gel electrolyte comprises a polymer gelled by a liquid solvent and a lithium salt. Preferably, the polymer rate in the gel electrolyte is between 0.5 and 8 wt %, preferably about 2%. The lithium salt is selected from those mentioned above. The cathode has an active material as described above. If the electrochemical cell which is obtained by the method of the invention is a lithium battery, the anode is preferably a film made of a material selected from metallic lithium, and lithium rich intermetallic alloys. If the electrochemical cell which is obtained by the method of the invention is a lithium-ion battery, the anode is made of a material which is able to reversibly insert and deinsert lithium ions, such as carbon or $Li_4Ti_5O_{12}$.

EXAMPLES

The present invention is further explained by means of the following examples, which are given for illustration purposes, and which are not limiting.

In each example, the electrochemical cell was assembled by stacking an anode film, a separator and a cathode film, inserting the assembled elements in a plastic metal bag, injecting an electrolyte composition into the assembled cell, and sealing the plastic metal bag. Electrochemical characterization of the cells was performed by using a Macpile® system (France).

Example 1

A cell was mounted by assembling a graphite electrode, a metal lithium electrode and a Celgard 3501® separator placed between the electrodes.

The Graphite Electrode

Graphite with a 12 μm particle size (SNG12 from Hydro-Quebec) was mixed with 2% wt of a vapor growth carbon fiber (VGCF from Showa Denko, Japan) by co-grinding. The Graphite-VGCF mixture was then mixed with 5% wt of PVDF (from Kruha Japan). N-methylpyrrolidone was added to obtain slurry.

The slurry was coated on Cu collector via Doctor Blade technique, and the coated collector was dried at 120° C. for 24 h.

The Lithium Electrode

The lithium electrode is metal lithium foil.

The Liquid Electrolyte Composition $LiPF_6$ was dissolved in a EC/DEC (3/7) mixture, to form a 1 M solution, and a polymer was added in an amount of 2% wt. The polymer is a copolymer of methyl metacrylate and oxetanyl methacrylate having 10 mol % of oxetanyl group and an average molecular weight of 400,000. Said polymer is provided as ELEXCEL™ ACG by Dai-ichi Kogyo Seiyaku Co. Ltd.

The as assembled electrochemical cell "graphite/electrolyte/lithium metal" has an open circuit voltage (OCV) of 3.2 V vs $Li^+/Li$.

Prior Art Crosslinking Method

In a first experiment, after assembling the electrochemical cell, the liquid electrolyte composition was crosslinked by heating at 60° C. for 5 h. After the heat treatment, the OCV of the cell was 3.1 V.

The electrochemical evaluation of the cell was performed by using a Macpile® system (France). The cell was first discharged at C/24 (i.e. in 24 hours) and thereafter charged at the same rate between 0 V and 2.5 V. The coulombic efficiency (defined as the ratio "charged capacity/discharged capacity") of the first cycle CE1 was 84%. The irreversible capacity loss is the consequence of the formation of a passivation layer, so called solid electrolyte interface (SEI). The reversible capacity of the cell obtained by prior art crosslinking of the polymer is 310 mAh/g.

In the present experiment, the graphite electrode was directly in contact with the gel electrolyte formed before discharging the cell.

Crosslinking According to the Invention

In a second experiment, the as assembled electrochemical cell graphite/electrolyte/lithium metal is not submitted to heat treatment, but is directly submitted to a single discharge-charge cycle at C/24 between 0 V and 2.5 V at 25° C. The first coulombic efficiency (CE1) was 91%.

In this experiment, the passivation layer SEI was formed during the formation of the gel electrolyte. This means that the SEI layer is bonded with the gel electrolyte formed in situ. During this in situ gel formation, the $LiPF_6$ salt from the electrolyte and the LiF compound of the SEI layer promote reaction of the polymerizable side groups of the polymer during the discharge-charge process.

The reversible capacity was 365 mAh/g.

In the first cycle of a lithium battery, the passivation layer (SEI) is formed, and the coulombic efficiency CE and the reversible capacity of the first cycle are the most important characteristics. Comparison of the results of both experiments shows that the $1^{st}$ CE and the reversible capacity are higher in a cell obtained according to the method of the present invention, than in a cell according to the prior art method comprising a heat treatment before the $1^{st}$ cycling. After the passivation layer is formed in an electrochemical cell of the invention, the CE reaches 100% during the second cycle. CE and the reversible capacity (365 mAh/g) remain stable upon further cycling.

Example 2

Carbonated $LiFePO_4$ Electrode

A cell was mounted by assembling a carbonated $LiFePO_4$ electrode, a metal lithium electrode and a Celgard 3501® separator placed between the electrodes.

The $LiFePO_4$ Electrode

A carbon coated $LiFePO_4$ (designated C—$LiFePO_4$ with a 200 nm particle size (from Phostech Lithium Inc) was mixed with 3% wt of acetylene black (Chevron, USA) and 3% wt of VGCF by co-grinding. The mixture was then mixed with 12% wt of PVDF. N-methylpyrrolidone was added to obtain a slurry. The slurry was coated on an Al collector via Doctor Blade technique, and the coated collector was dried at 120° C. for 24 h.

The Lithium Electrode

The lithium electrode is identical to the lithium electrode of example 1.

The Liquid Electrolyte Composition

The liquid electrolyte composition is identical to that of example 1. The as assembled electrochemical cell "C—$LiFePO_4$/electrolyte/lithium metal" has an open circuit voltage (OCV) of 3.2 V vs $Li^+/Li$.

Prior Art Crosslinking Method

In a first experiment, after assembling the electrochemical cell, the liquid electrolyte composition was crosslinked by heating at 60° C. for 5 h. After the heat treatment, the OCV of the cell was 3.1 V.

The cell was first charged at C/24 and thereafter discharged at the same rate between 4 V and 2 V. The coulombic efficiency of the first cycle (CE1) was 96%. The reversible capacity was 158 mAh/g.

Method According to the Invention

In a second experiment, the as assembled electrochemical cell C—$LiFePO_4$/electrolyte/lithium metal is not submitted to heat treatment, but is directly submitted to a single charged-discharged at C/24 between 4 V and 2 V at 25° C.

The first coulombic efficiency ($1^{st}$ CE) was 99%. The reversible capacity was 165 mAh/g.

Comparison of the results of both experiments shows that the $1^{st}$ CE and the reversible capacity are higher in a cell obtained according to the method of the present invention, than in a cell according to the prior art method comprising a heat treatment before the $1^{st}$ cycling.

When the cell is heated before cycling, the gel electrolyte is formed in contact with the C—$LiFePO_4$ electrode. In contrast, when the cell is cycled at 25° C., the gel electrolyte and the passivation layer (SEI) are formed simultaneously. Formation of the passivation layer provides LiF. Both LiF and the lithium salt $LiPF_6$ of the electrolyte act as a catalyst for the in situ crosslinking of the polymer to provide a stable gel electrolyte with an excellent bridge between SEI and the gel electrolyte.

Example 3

Li-Ion Battery

A cell was mounted by assembling a C—$LiFePO_4$ electrode prepared according to example 2, a graphite electrode prepared according to example 1 and a Celgard 3501® separator placed between the electrodes. The electrolyte composition is identical to that of examples 1 and 2.

The as assembled cell has an OCV of 50 mV.

Prior Art Method

In a first experiment, after assembling the electrochemical cell, the liquid electrolyte composition was crosslinked by heating at 60° C. for 51 h. After the heat treatment, the OCV of the cell was 110 mV.

The cell was first charged at C/24 and thereafter discharged at the same rate between 4 V and 2 V. The coulombic efficiency of the first cycle CE1 was 82%. The reversible capacity was 145 mAh/g based on the $LiFePO_4$ capacity.

Method According to the Invention

In a second experiment, the as assembled electrochemical cell C—$LiFePO_4$/electrolyte/graphite is not submitted to heat treatment, but is directly submitted to a single charged-discharged at C/24 between 4 V and 2 V at 25° C.

After the first cycle, the coulombic efficiency (CE1) is 89% and the reversible capacity was 153 mAh/g. After the second cycle, the CE is 100%.

Comparison of the results of both experiments shows that the CE1 and the reversible capacity are higher in a cell obtained according to the method of the present invention, than in a cell according to the prior art method comprising a heat treatment before the $1^{st}$ cycling.

When the cell is heated before cycling, the gel electrolyte is formed in contact with the C—$LiFePO_4$ electrode and with the graphite electrode. In contrast, when the cell is cycled at 25° C., the gel electrolyte and the passivation layer (SEI) are formed simultaneously. Formation of the passivation layer on the graphite and on the C—$LiFePO_4$ provides LiF. Both LiF and the lithium salt $LiPF_6$ of the electrolyte act as a catalyst for the in situ crosslinking of the polymer. Crosslinking provides a stable gel electrolyte with an excellent bridge between both SEI and the gel electrolyte.

Example 4

A cell was mounted by assembling a C—$LiFePO_4$ electrode prepared according to example 2, a $Li_4Ti_5O_{12}$ electrode prepared according to example 1 with aluminum collector, and a Celgard 3501® separator placed between the electrodes. The electrolyte composition is identical to that of examples 1 and 2.

The as assembled cell has an OCV of 75 mV.

Prior Art Method

In a first experiment, after assembling the electrochemical cell, the liquid electrolyte composition was crosslinked by heating at 60° C. for 51 h. After the heat treatment, the OCV of the cell was 80 mV.

The cell was first charged at C/24 and thereafter discharged at the same rate between 2.8 V and 1 V. The coulombic efficiency of the first cycle CE1 was 91%. The reversible capacity was 150 mAh/g based on the $LiFePO_4$ capacity.

Method According to the Invention

In a second experiment, the as assembled electrochemical cell C—$LiFePO_4$/electrolyte/graphite is not submitted to heat treatment, but is directly submitted to a single charge-discharge at C/24 between 2.8 V and 1 V at 25° C.

After the first cycle, the coulombic efficiency (CE1) was 96% and the reversible capacity was 159 mAh/g. After the second cycle, the CE was 100% and the reversible capacity was 158 mAh/g.

Comparison of the results of both experiments shows that the CE1 and the reversible capacity are higher in a cell obtained according to the method of the present invention, than in a cell according to the prior art method comprising a heat treatment before the $1^{st}$ cycling.

When the cell is heated before cycling, the gel electrolyte is formed in contact with the C—$LiFePO_4$ electrode and with the graphite electrode. In contrast, when the cell is cycled at 25° C., the gel electrolyte and the passivation layer (SEI) are formed simultaneously. Formation of the passivation layer on the graphite and on the C—$LiFePO_4$ provides LiF. Both LiF and the lithium salt $LiPF_6$ of the electrolyte act as a catalyst for the in situ crosslinking of the polymer. Crosslinking provides a stable gel electrolyte with an excellent bridge between both SEI and the gel electrolyte.

The invention claimed is:

1. A method for manufacturing an electrochemical cell having an anode and a cathode separated by a separator and a gel electrolyte, said method comprising the steps of assembling the anode, the cathode and the separator, and injecting a liquid electrolyte composition between the anode and the cathode, said liquid electrolyte composition comprising a polymer, an aprotic liquid solvent and a lithium salt, wherein:
the polymer in the liquid electrolyte composition is a non-cross-linked polymer that has functional groups capable of polymerizing via cationic polymerization;
the liquid electrolyte composition does not contain any crosslinking agent or polymerization initiator; and
the cell is submitted to an electrochemical cycling comprising a charging step and a discharging step, without any preliminary heating step or irradiation step, said cycling causing crosslinking of the polymer.

2. The method of claim 1, wherein the polymer used for preparing the liquid electrolyte composition is a polymer which has side groups which are polymerizable via cationic route.

3. The method of claim 2, wherein the side groups are allyl groups or cyclic ethers groups selected from oxiranyl, oxetanyl, tetrahydrofuranyl and tetrahydropyranyl groups.

4. The method of claim 1, wherein the polymer is a straight chain polymer having cationic polymerizable groups as side groups or a branched polymer having cationic polymerizable groups as end groups.

5. The method of claim 1, wherein the polymer is a copolymer having the following monomeric units

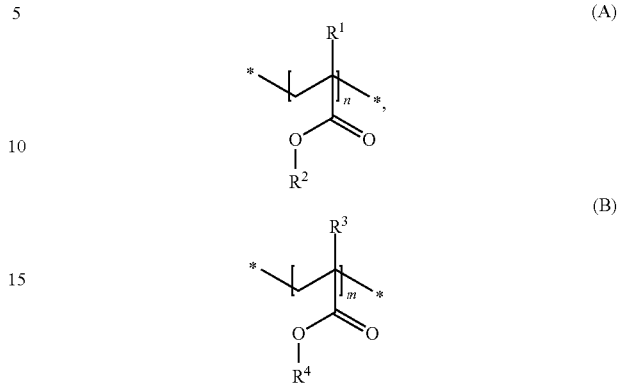

wherein: each of $R^1$ and $R^3$ is H or a methyl group, $R^2$ is a group which is unpolymerizable, $R^4$ is a group which is polymerizable via cationic route, and n is the number of monomeric units A and m is the number of monomeric units B in the copolymer, said copolymer having a molecular weight which is from 200,000 to 700,000, and a $m/(n+m)$ ratio which is from 0.1 to 0.6.

6. The method of claim 5, wherein the unpolymerizable group is selected from: alkyl, alkenyl, cycloakyl, and aryl groups; groups derived from alkyl or alkenyl groups by insertion of a heteroatom; and cycloalkyl or aryl groups having a heteroatom (O or N) in the ring.

7. The method of claim 1, wherein the aprotic liquid solvent is a linear or cyclic ether, an ester, a nitrile, an amide, a sulfone, a sulfolane, an alkylsulfamide, or a partly halogenated hydrocarbide.

8. The method of claim 1, wherein the aprotic liquid solvent is a salt having an organic cation which is an amidinium, a guanidinium, a pyridinium, a pyrimidinium, an imidazolium, an imidazolinium, a triazolium, or a phosphonium, and an anion selected from $(FSO_2)_2N^-$ (FSI), $(CF_3SO_2)_2N^-$ (TFSI), $(C_2F_5SO_2)_2N^-$ (BETI), $PF_6^-$, $BF_4^-$, $ClO_4^-$, $CF_3SO_2$, oxalyldifluoroborate (BOB), and dicyanotriazolate (DCTA).

9. The method of claim 1, wherein the weight ratio polymer/liquid solvent in the liquid electrolyte composition, is between 0.5 and 8%.

10. The method of claim 1, wherein the salt concentration in the liquid electrolyte composition is between 0.1 and 2.5 M.

11. The method of claim 1, wherein the lithium salt is selected from lithium halogenides, lithium perfluorosulfonates, lithium (trifluoromethylsulfonyl)imide, lithium bis(trifluoromethylsulfonyl)methide, lithium tris(trifluoromethylsulfonyl)-methide, lithium perchlorate, lithium hexafluoroarseniate, lithium hexafluorophosphate, lithium hexafluoroantimonate, lithium tetrafluoroborate, lithium bisperfluoroethylsulfonyl imide, lithium_bis(fluorosulfonyl)imide, and lithium oxalyldifluoroborate.

12. The method of claim 1, wherein the electrochemical cycling is performed at a cycling rate from C/5 to C/30.

13. The method of claim 1, wherein the anode is made of a material selected from metallic lithium, a lithium rich intermetallic alloy such as Li—Al, Li-steel, Li—Sn, Li—Pb, SiO, SnO, $SnO_2$, SnCoC, carbon or $Li_4Ti_5O_{12}$.

14. The method of claim 1, wherein the cathode has an active material selected from: metal oxides such as $LiCoO_2$, $LiMn_2O_4$, $LiMn_{1/3}Co_{1/3}Ni_{1/3}O_2$, $LiNiO_2$ and $Li(NiM')O_2$ wherein M' represents one or two metal elements selected from Mn, Co, Al, Fe, Cr, Cu, Ti, Zr, Mg, Zn; and phosphates such as $LiFePO_4$, and $LiMPO_4$ where M is Ni, Mn, or Co, said oxides or phosphates possibly being in carbonated form.

15. The method of claim 1, wherein the lithium salt is lithium hexafluorophosphate.

16. The method of claim 1, wherein the lithium salt is selected from lithium perfluorosulfonates, lithium (trifluoromethylsulfonyl)imide, lithium bis(trifluoromethylsulfonyl)methide, lithium tris(trifluoromethylsulfonyl)-methide, lithium hexafluoroarseniate, lithium hexafluorophosphate, lithium hexafluoroantimonate, lithium tetrafluoroborate, and lithium oxalyldifluoroborate.

17. An electrochemical cell obtained by the method of claim 1.

18. The electrochemical cell of claim 17, wherein the lithium salt is selected from lithium perfluorosulfonates, lithium (trifluoromethylsulfonyl)imide, lithium bis(trifluoromethylsulfonyl)methide, lithium tris(trifluoromethylsulfonyl)-methide, lithium hexafluoroarseniate, lithium hexafluorophosphate, lithium hexafluoroantimonate, lithium tetrafluoroborate, and lithium oxalyldifluoroborate.

19. The electrochemical cell of claim 17, wherein the lithium salt is lithium hexafluorophosphate.

20. The electrochemical cell of claim 17, which comprises a separator impregnated by a gel electrolyte, between an anode and a cathode, wherein the gel electrolyte comprises a polymer gelled by a liquid solvent and a lithium salt.

21. The electrochemical cell of claim 17, wherein the polymer rate is between 0.5 and 8 wt %.

22. The electrochemical cell of claim 17, wherein the lithium salt is selected from lithium halogenides, lithium perfluorosulfonates, lithium (trifluoromethylsulfonyl)imide, lithium bis(trifluoromethylsulfonyl)methide, lithium tris(trifluoromethylsulfonyl)methide, lithium perchlorate, lithium hexafluoroarseniate, lithium hexafluorophosphate, lithium hexafluoroantimonate, lithium tetrafluoroborate, lithium bisperfluoroethylsulfonyl imide, lithium bis(fluorosulfonyl) imide, and lithium oxalyldifluoroborate.

23. The electrochemical cell of claim 17, wherein the cathode has an active material selected from: metal oxides such as $LiCoO_2$, $LiMn_2O_4$, $LiMn_{1/3}Co_{1/3}Ni_{1/3}O_2$, $LiNiO_2$ and $Li(NiM')O_2$ wherein M' represents one or two metal elements selected from Mn, Co, Al, Fe, Cr, Cu, Ti, Zr, Mg, Zn; and phosphates such as $LiFePO_4$, and $LiMPO_4$ where M is Ni, Mn, or Co, said oxides or phosphates possibly being in carbonated form.

24. The electrochemical cell of claim 17, wherein the anode is a film made of metallic lithium, or of a lithium rich intermetallic alloy.

25. The electrochemical cell of claim 17, wherein the anode is made of carbon, $Li_4Ti_5O_{12}$, $SiO_x$ where $0.05<x<1.95$ or a mixture thereof.

* * * * *